Jan. 22, 1952     O. AMIET     2,583,314
COLLET FEED MECHANISM FOR AUTOMATIC CUTTING MACHINES
Original Filed Aug. 1, 1947
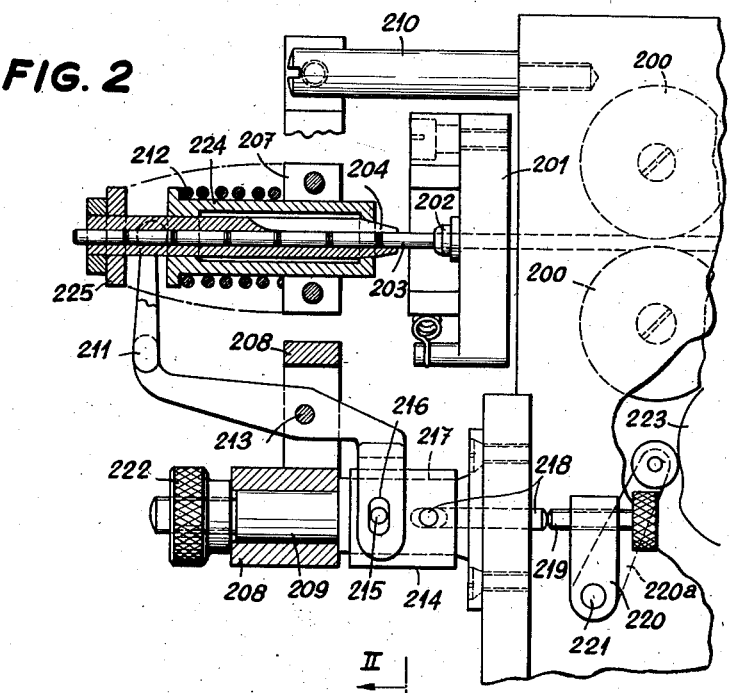
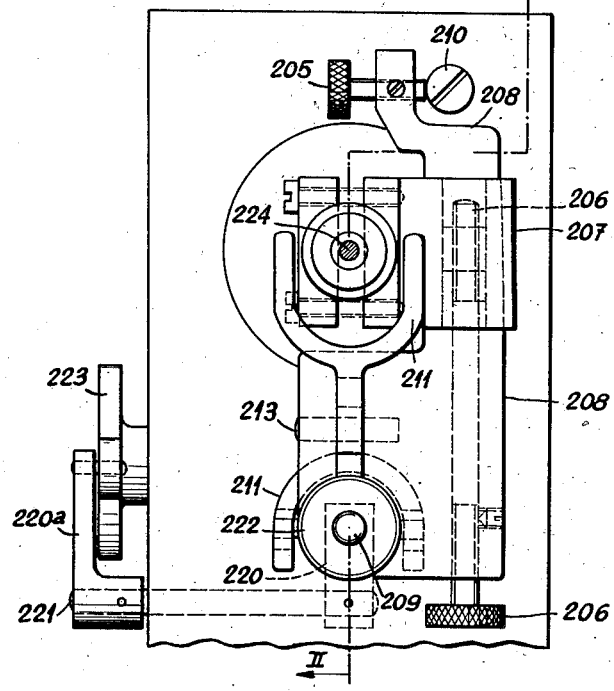
Oscar Amiet
Inventor
By *Robert E. Burns*
Attorney Patented Jan. 22, 1952

2,583,314

UNITED STATES PATENT OFFICE 2,583,314

COLLET FEED MECHANISM FOR AUTOMATIC CUTTING MACHINES

Oscar Amiet, La Chaux de Fonds, Switzerland, assignor to Mistress Albert Murbach, Colombier, Switzerland Original application August 1, 1947, Serial No. 765,581. Divided and this application March 1, 1949, Serial No. 78,920. In Switzerland June 14, 1946

2 Claims. (Cl. 279—43)

The present application is a division of my copending application filed August 1, 1947, Serial No. 765,581.

The present invention refers to an automatic cutting machine, of the type in which a toolholder carrying at least one cutting tool is mounted revolvably around the axis of the bar to be cut, and a device for guiding and feeding automatically the bar to be cut. This machine is characterized by the fact that an additional guiding element is provided for the bar to be cut, said element being arranged coaxially with the first mentioned guiding device but on the opposite side of the plane of rotation of the cutting tool, whereby the bar is held on both sides of the tool. This guiding element is adjustable in order to be able to be aligned exactly with the axis of the bar to be cut.

The attached drawing represents schematically and partially, by way of example, one embodiment of the invention.

Fig. 1 is a partial front view of this embodiment.

Fig. 2 is a partial elevation view with partial section along line II—II of Fig. 1.

The machine comprises a revolvable toolholder 201 at the center of which is placed a guiding die 202, in which passes the bar 203 to be cut, the automatic feed of which is realised by a feeding wheel 200 actionated by a cam not shown on the drawing.

In front of the guiding die 202, there is a clamping chuck 204, the opening and closing movement of which is controlled by a cam 223. In addition, the chuck 204 can be aligned exactly with the die 202 by means of the adjusting screws 205 and 206. To that effect, the chuck 204 is mounted on a sledge 207 apt to slide along a lever 208 under the action of a screw 206. Said lever 208 is pivoted at 209, for allowing swinging it for removing the chuck 204 from the bar, for example, when one wants to adjust the tools on the tool-holder 201. The screw 205 bears by its end on an abutting finger 210 secured on the frame of the machine.

The chuck 204 is closed by the spring 212, which tightens the inner cone of the sleeve 224 on the outer cone of the chuck. It opens by an axial motion of the sleeve 224 towards the chuck 202. This motion, caused by the lever 211, liberates the cone of the chuck 204, which is retained axially by its rear end, screwed in an arm 225 of the sledge. The lever 211 is pivoted at 213 in the lever 208 and is itself controlled at its opposite end, which is also fork-shaped for cooperation with a sleeve 214, with the lugs 215 of which it is engaged by oval holes 216. This sleeve can slide axially on the base 217 of the finger 209 under the action of the two pins 218, one of which is in the axis, and the other at right angle to the axis of the base 217; these two pins cooperate with a contacting screw 219 of a lever 220 pivoted at 221 and keyed on a common axis with a lever 220a operated by the cam 223.

A milled nut 222 screwed at the end of the finger 209 allows the lever 208 to be blocked in working or resting positions.

The operation of this machine is as follows:

The clamping chuck 204 is set exactly in alignment with the guiding die 202 by adjusting the screws 205 and 206. When cutting, the bar is held both in chuck and die, whereby a great stiffness is secured. Immediately before the automatic feed of the bar, the chuck 204 is open. As soon as the bar has been fed, the chuck 204 is clamped again on the bar.

This device enables increasing the production and the precision. The bar being held on both sides of the plane of rotation of the cutting tools, it has a far smaller deflection than when it is held on one side only, and one can remove chips of greater thickness. In addition, the pieces are cut cleanly without stud. The clamping chuck being adjustable, the machine is adapted for working precision pieces.

The advantage of this machine is thus to ensure an absolute rigidity of the work-piece and to permit of a high precision.

What I claim is:

1. In an automatic cutting machine, a frame, a clamping chuck, a swinging arm pivoted on said frame and adapted to be moved along an arc, a sledge sliding longitudinally on said arm along a radius of said arc and carrying said clamping chuck, an adjusting screw cooperating with said sledge to adjust its position on said arm, an adjustable abutment screw cooperating with said arm to adjust its position relative to the frame, whereby the centering of the chuck is adjustable in two directions at right angles to one another.

2. In an automatic cutting machine, a frame, a clamping chuck, a swinging arm pivoted on said frame and adapted to be moved along an arc, a sledge sliding on said arm along a radius of said arc and carrying said clamping chuck, an adjusting screw cooperating with said sledge to adjust its position on said arm, an adjustable abutment screw cooperating with said arm to adjust its position relative to the frame, a locking sleeve slidingly mounted on said chuck, a spring tending to maintain said sleeve in the locking position, a release lever mounted on said swinging arm and actuating said sleeve, a locking nut for said swinging arm, operative means for said release lever carried by the pivot of said swinging arm, whereby the centering of the chuck is adjustable in two directions at right angles to one another, and, by swinging said lever, the chuck can be removed from the shaft, without disturbing the adjusting of said centering.

OSCAR AMIET.

REFERENCES CITED

The following references are of record in the file of this patent:

UNITED STATES PATENTS

| Number | Name | Date |
| --- | --- | --- |
| 1,279,965 | Bacon | Sept. 24, 1918 |
| 1,366,757 | Whitaker | Jan. 25, 1921 |
| 1,662,571 | Frick | Mar. 13, 1928 |
| 1,782,692 | Lawson | Nov. 25, 1930 |